United States Patent [19]

Dannenberg

[11] Patent Number: 5,018,087

[45] Date of Patent: May 21, 1991

[54] PROGRAMMING SIGNAL SOURCE AND CALIBRATION DATA FOR A SPEEDOMETER/TACHOMETER WITH CALIBRATION SWITCHES

[75] Inventor: Robert D. Dannenberg, Garrett, Ind.

[73] Assignee: Navistar International Transportation Corp., Chicago, Ill.

[21] Appl. No.: 431,502

[22] Filed: Nov. 3, 1989

[51] Int. Cl.[5] .................. G01P 21/02; G01P 21/00; G06G 7/70

[52] U.S. Cl. .................. 364/571.01; 324/160; 324/166; 364/431.12; 364/571.04; 364/571.07; 364/571.08; 364/565; 341/120

[58] Field of Search ............... 324/160, 163, 166, 130, 324/74, 161; 341/118, 120; 364/431.07, 431.12, 571.01, 571.04, 571.07, 571.08, 565

[56] References Cited

U.S. PATENT DOCUMENTS

| | | | |
|---|---|---|---|
| 3,614,617 | 10/1971 | Blake | 324/166 |
| 3,739,270 | 6/1973 | Miller et al. | 324/166 |
| 4,074,196 | 2/1978 | Webster | 324/166 |
| 4,140,970 | 2/1979 | Graziano | 324/166 |
| 4,167,699 | 9/1979 | Baker | 324/171 |
| 4,179,740 | 12/1979 | Malin | 364/571.08 X |
| 4,197,585 | 4/1980 | Moorey et al. | 364/571.08 X |
| 4,491,007 | 1/1985 | Crowdes | 73/2 |

Primary Examiner—Reinhard J. Eisenzopf
Assistant Examiner—Warren S. Edmonds
Attorney, Agent, or Firm—F. David AuBuchon; Dennis K. Sullivan

[57] ABSTRACT

A speedometer/tachometer assembly for an automotive vehicle, such as a heavy truck, has a ten section DIP switch for calibrating the speedometer and a like switch for calibrating the tachometer. When set to all "0's", each switch causes the corresponding meter to be driven by a variable frequency signal from a corresponding sensor, as calibrated by a corresponding calibration factor that has been preloaded in the non-volatile memory of a microprocessor that operates the meters. When set to all "1's", each switch causes the corresponding meter to be operated from pre-calibrated data appearing on a data link. When set to any other setting, the setting determines the calibration factor that is applied to the uncalibrated signal, and this is used to drive the corresponding meter.

20 Claims, 1 Drawing Sheet

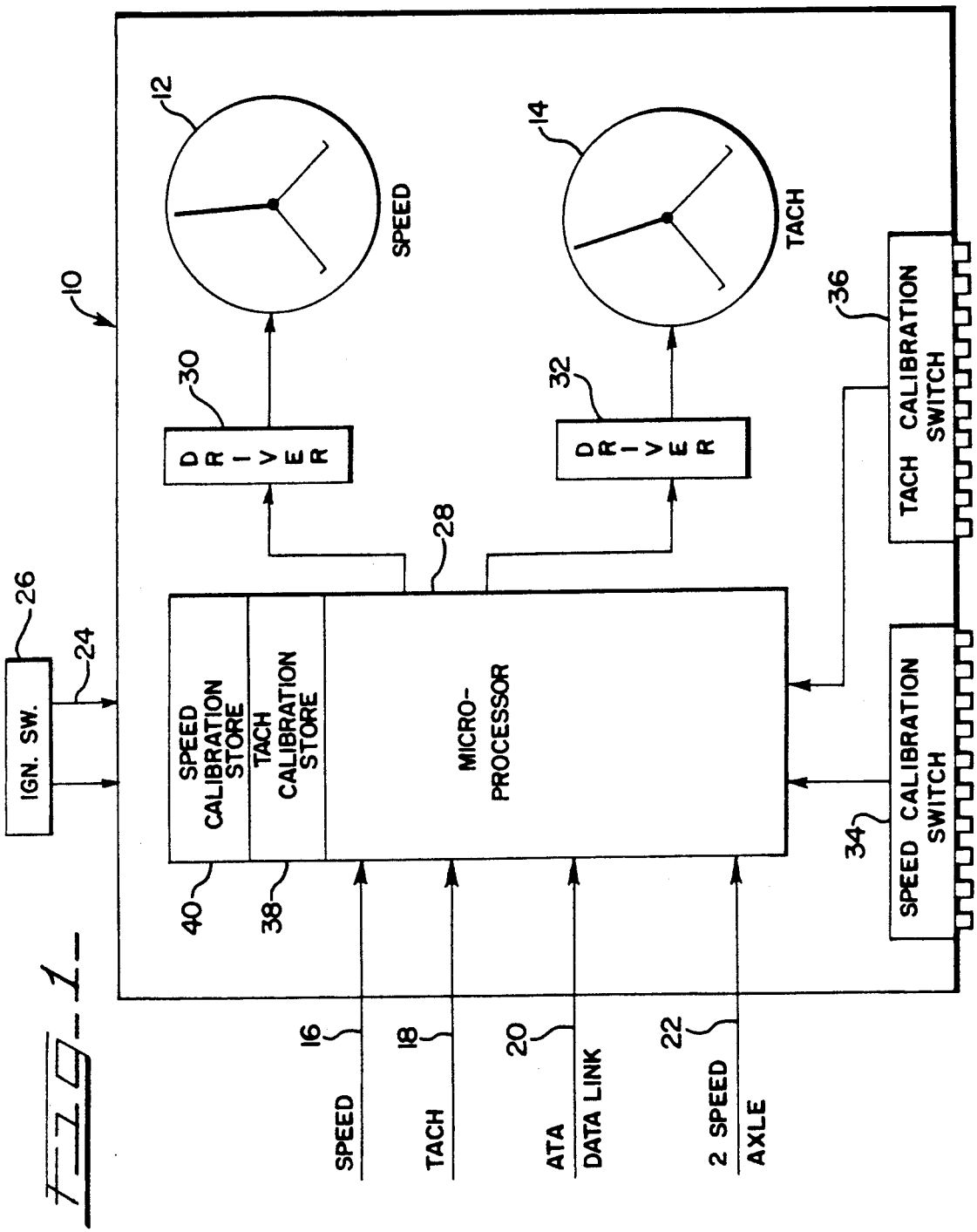

PROGRAMMING SIGNAL SOURCE AND CALIBRATION DATA FOR A SPEEDOMETER/TACHOMETER WITH CALIBRATION SWITCHES

BACKGROUND AND SUMMARY OF THE INVENTION

This invention relates generally to automotive vehicle instrumentation systems and, more specifically, to improvements in meters that display information, such as speedometers and tachometers for example. Although the presently preferred embodiment of the invention will be hereinafter disclosed in the context of a combination speedometer/tachometer, some principles are more universally applicable. In a more generic sense, one aspect of the invention involves the use of mechanically operated electrical switches to concurrently program a meter to a particular one of plural signal sources and to an appropriate calibration for that particular signal source. A more specific aspect of the invention as applied to an automotive vehicle speedometer or tachometer involves the ability to reliably assemble the device with an initial predetermined programming of speed signal source selection and calibration that is suitable for certain vehicle models, while enabling the device to be conveniently re-programmed for selection of an alternative speed signal source and different calibration appropriate for such alternative speed signal source. Such re-programming can be performed before the vehicle leaves the factory and thereafter, as may be required.

In today's automotive vehicles, instrumentation clusters must be more versatile because they must adapt to vehicle configurations where the signal source may come from either conventional pick-ups or serial data links, such as the SAE standard J1708 data link used in heavy trucks. In the case of a speedometer/tachometer, many combinations of variables like tire size, differential gearing, number of transmission wheel teeth, and number of flywheel teeth compound the problem of calibrating the incoming speed signals. Change in any one of these parameters affects signal frequency, and so the cluster must calibrate the road speed or engine speed indications based on the specific values of these variables.

From the standpoint of simplifying parts requirements, it is desirable to have a common meter for all vehicle configurations, but this poses a number of questions. Can a single speedometer/tachometer be manufactured that will operate from conventional signal pick-ups or from an SAE 1708 serial data link with the changing of a switch setting? Can the assembly be electronically programmed with calibration data to prevent human error in switch setting? Can the factory preset be verified? Can the customer in the field modify the calibration setting if, for example, the tire size is changed?

The present invention is directed to a novel and unique improvement that enables these questions to be answered in the affirmative.

THE PRIOR ART

Although it is known in the state of the art to use switches to calibrate speedometers and tachometers, previous devices lack the versatility of signal source selection between a serial data link and pick-ups. These previous devices are designed to operate from one or the other, but not both. Devices that have been heretofore used in the heavy trucking industry do not have the ability to accept or retain electronic data transfers of calibration data or other variables. They also require human intervention to set a number of switches.

From the standpoint of prior art that is disclosed in U.S Pat. Nos. reference is made to 3,614,617; 3,739,270; 4,074,196; 4,167,699; 4,140,970; and 4,491,007. These patents confirm the fact that it is known to use switches to calibrate automotive speedometers/tachometers.

The present invention provides significant advantages over the prior art. One feature is that a unique setting of calibration switches is effective to independently steer either pick-up signals or an SAE J1708 serial data link to a speedometer/tachometer. Another feature is that the cluster can be made more generic, thereby reducing the number and types of parts requiring inventory. A further feature is that calibration values may be loaded electronically, thereby eliminating the potential for human error due to the need to manually set the calibration switches on the assembly line. Moreover, the calibration values may be electronically verified regardless of whether the device is operating from factory presets or from the switch settings. Still another feature is that the vehicle owner or operator can reset the calibrations if such ever becomes necessary due to a change in tire size or differential gearing for example, and this resetting can be accomplished without special tools or the necessity of visiting a dealer.

Further features of the invention, along with additional benefits and advantages, will be perceived by the reader as the description proceeds. A drawing accompanies the description and illustrates a presently preferred embodiment of the invention according to the best mode contemplated at this time in carrying out the invention.

BRIEF DESCRIPTION OF THE DRAWING

FIG. 1 is a schematic block diagram illustrating a speedometer/tachometer embodying principles of the invention.

DESCRIPTION OF THE PREFERRED EMBODIMENT

The drawing shows a speedometer/tachometer assembly 10 containing a speedometer 12 and a tachometer 14 that display vehicle speed and engine speed respectively. By way of example, the two meters 12, 14 are preferably sine/cosine air core type meters each having an indicating range of 270 degrees of needle movement.

Assembly 10 receives three data signal inputs. Input 16 is a speedometer signal input that delivers vehicle speed data from a vehicle speed pick-up; input 18 is a tachometer signal input that delivers engine speed data from an engine speed pick-up; input 20 is a serial data link input, preferably in accordance with SAE standard J1708, via which data can be electronically transferred between certain components of the vehicle's electrical/electronic system that are on the data link.

The pick-up that provides the speedometer input 16 is typically mounted on the transmission to sense the rotational speed of a wheel that rotates in unison with the transmission output shaft. The transmission output shaft is linked with the driven rear wheels of the vehicle through a rear axle that contains a differential whereby the pick-up provides a train of output pulses whose frequency is equal to the averaged speed of the driven rear wheels, a suitable indicator of vehicle speed. If the vehicle has a multiple speed axle, the particular axle selection obviously affects the calibration of the input signal 16, and therefore, the axle selection is a further input 22 to assembly 10. The assembly is rendered operative when the vehicle ignition switch is turned on, and therefore suitable D.C. supply voltage delivered to the assembly at 24 when the ignition switch 26 is turned on.

Assembly 10 contains its own microprocessor 28 that receives the inputs 16, 18, 20, and 22. In turn the microprocessor operates meters 12, 14 through respective driver circuits 30, 32.

Assembly 10 further comprises a speedometer calibration switch 34 and a tachometer calibration switch 36. Advantageously, these calibration switches are ten section DIP switches of the side access type. They are mounted on assembly 10 so that they are capable of being manually set through openings in the side of the assembly housing. Suitable markings are included so that the switches 34, 36 are clearly and correctly identified and so that the respective "0" and "1" positions of each section are also clearly and correctly designated.

One of the unique aspects of the present invention involves the interaction of calibration switches 34, 36 with the operation of meters 12, 14 from the various signal inputs. Each calibration switch 34, 36 provides three distinct modes of operation for the corresponding meter 12, 14. For convenience these modes are referred to as ATA Link Mode, Factory Preset Mode, and Normal Switch Mode.

Each calibration switch 34, 36 is itself a separate pre-fabricated assembly that is assembled into the assembly 10 during the process of manufacturing the assembly 10. In its pre-fabricated condition each calibration switch 34, 36 has all of its sections set to the same state, for example all "0's" or all "1's". For purposes of the ensuing description, it will be assumed that this initial setting is all "0's".

The processing of input data by microprocessor 28 for operating the meters 12, 14 is conditioned by requiring the microprocessor to read the calibration switches 34, 36 to ascertain the particular mode that the calibration switches are establishing. In their pre-fabricated condition of all sections being set to "0", the calibration switches define the Factory Preset Mode. In this mode, tachometer 14 indicates the tachometer signal input 18, as calibrated by a factory preset that is entered in non-volatile memory 38 of microprocessor 28; speedometer 12 indicates the speedometer input signal 16, as calibrated by the axle selection 22 and a factory preset that is entered in non-volatile memory 40 of microprocessor 28. The factory presets that are entered in memories 38, 40 are determined by the particular vehicle configuration (i.e., tire size, differential gearing, etc.) so that the speedometer/tachometer assembly is accurately calibrated to the frequencies of the respective speed signals 16, 18. For reasons which will become more apparent from the later description, it is especially advantageous to enter the factory presets into memory via data link 20 during the fabrication of assembly 10, and to have the factory presets in the form of ten bit entries corresponding to the number of sections of each calibration switch. So long as the calibration switches remain in the factory preset mode, any vehicle speed or engine speed data published on the data link 20 will be ignored by assembly 10.

The ATA Link Mode is invoked by setting all sections of the calibration switches to "1's". When the calibration switches are now read by the microprocessor, the speedometer and tachometer signals 16, 18 are ignored, and speed and tach data published on data link 20 drive the meters 12, 14. Microprocessor 28 performs no calibration of the data link data since the data on the data link is already calibrated by definition of the SAE J1708 standard.

The Normal Switch Mode is invoked by setting each of the calibration switches to a setting that is other than all "0's" or all "1's". In this mode the speedometer and tachometer 12, 14 are driven from the inputs 16, 18, as calibrated by a factor corresponding to the respective calibration switch setting. Speed and tach values published on the ATA link input 20 will be read by microprocessor 20, but not used to drive the gauges. Thus, in this mode, the calibration switches directly calibrate the meters according to the particular settings of the switches. This is also where the significance of having ten bit factory presets can be seen because the factory preset will have the same format as the calibration switches themselves, i.e. ten bits.

The vehicle owner or operator is therefore able to re-program either or both meters by appropriate changing of the calibration switch setting or settings, whenever the need arises to make a change in calibration. An accompanying table or chart can furnished as an aid to performing the re-programming so that the owner or operator will know the precise switch settings for proper re-calibration.

The invention is therefore seen to promote manufacturing quality and functional enhancements. An assembly can be programmed electronically without human intervention or error. The SAE serial data link provides an ideal means to program and to verify calibration data. Data for an individual vehicle can be extracted from the order data base which contains an identification of the specific vehicle components that determine the required calibration, and then specific calibration data for an assembly can be downloaded into a generic assembly to customize it for the specific vehicle. This can be done without the possible error associated with setting of switches by hand.

The invention is also ideally suited for verification of calibration data. Loading of calibration data can be questionable if it is not verified, and this is true whether the transaction is performed electronically, or by setting the calibration switches. An assembly embodying the invention can be electronically interrogated by a unit tester to verify successful storage of an electronic data transfer or whether the calibration switch settings are correct. Of course, the ability to electronically program the meters, and to assure the use of that data in the meters by setting the calibration switches to all "0's", significantly promote manufacturing quality. Because it is possible to select the particular signal sources that drive the meters, the invention has significant versatility.

While a presently preferred embodiment of the invention has been disclosed and described, it should be understood that principles of the invention may be practiced in other equivalent embodiments.

WHAT IS CLAIMED IS:

1. In an automotive vehicle which has a multi-component powertrain that imparts motion to the vehicle and an instrumentation system, including a meter that is operated by an operating signal from a microprocessor to indicate the operational speed of a particular powertrain component, and wherein the meter operating signal must be calibrated to such particular powertrain component so that the meter accurately presents the operational speed of the particular powertrain component, an improved calibration means for calibrating the meter operating signal which comprises a fixed preset calibration that is stored in a non-volatile memory of the microprocessor, a first speed signal input for receiving from a sensor associated with said particular component an uncalibrated speed signal, a second speed signal input for receiving a pre-calibrated speed signal from a data link, and a combined calibration and selection means that is read by the microprocessor to calibrate the meter operating signal, said combined calibration and selection means comprising selection switch means operable to a first setting to cause the meter to be operated by the pre-calibrated speed signal received at said second speed signal input, to a second setting to cause the meter to be operated by the uncalibrated speed signal received at said first speed signal input, as calibrated by the fixed preset calibration that is stored in such non-volatile memory of the microprocessor, and to any selected setting of multiple additional settings to cause the meter to be operated by the uncalibrated speed signal input received at said second speed signal input, as calibrated by a particular calibration factor established by the particular selected setting of said multiple additional settings.

2. The improved calibration means set forth in claim 1 wherein said selection switch means comprises a set of individual binary switch sections, each of which is selectively operable to "1" and "0" settings.

3. The improved calibration means set forth in claim 2 wherein said set of individual binary switch sections, when said selection switch means is in said first setting, has each section at the same setting, and when said selection switch means is in said second setting, has each section in exactly the opposite setting as it had when said selection switch means was in said first setting.

4. The improved calibration means set forth in claim 3 wherein said first setting of said selection switch means corresponds to each of said individual binary switch sections being set to a "0" setting and said second setting of said selection switch means corresponds to each of said individual switch sections being set to a "1" setting.

5. The improved calibration means as set forth in claim 2 wherein the fixed preset calibration that is stored in non-volatile memory of said microprocessor comprises a set of bits equal in number to the number of said individual binary switch sections.

6. The improved calibration means set forth in claim 2 wherein said set of individual binary switch sections comprise a side access type DIP switch to permit the individual sections to be set through an opening in a side of a housing containing the meter.

7. For use in an automotive vehicle which has a multi-component powertrain that imparts motion to the vehicle and an instrumentation system, a meter that is operated by an operating signal from a microprocessor to indicate the operational speed of a particular powertrain component, and wherein the meter operating signal must be calibrated to such particular powertrain component so that the meter accurately presents the operational speed of the particular powertrain component, the improvement for calibrating the meter operating signal which comprises a fixed preset calibration that is stored in a non-volatile memory of the microprocessor, a first speed signal input for receiving from a sensor associated with said particular component an uncalibrated speed signal, a second speed signal input for receiving a pre-calibrated speed signal from a data link, and a combined calibration and selection means that is read by the microprocessor to calibrate the meter operating signal, said combined calibration and selection means comprising selection switch means operable to a first setting to cause the meter to be operated by the pre-calibrated speed signal received at said second speed signal input, to a second setting to cause the meter to be operated by the uncalibrated speed signal received at said first speed signal input, as calibrated by the fixed preset calibration that is stored in such non-volatile memory of the microprocessor, and to any selected setting of multiple additional settings to cause the meter to be operated by the uncalibrated speed signal input received at said second speed signal input, as calibrated by a particular calibration factor established by the particular selected setting of said multiple additional settings.

8. The improvement set forth in claim 7 wherein said selection switch means comprises a set of individual binary switch sections, each of which is selectively operable to "1" and "0" settings.

9. The improvement set forth in claim 8 wherein said set of individual binary switch sections, when said selection switch means is in said first setting, has each section at the same setting, and when said selection switch means is in said second setting, has each section in exactly the opposite setting as it had when said selection switch means was in said first setting.

10. The improvement set forth in claim 9 wherein said first setting of said selection switch means corresponds to each of said individual binary switch sections being set to a "0" setting and said second setting of said selection switch means corresponds to each of said individual switch sections being set to a "1" setting.

11. The improvement set forth in claim 8 wherein the fixed preset calibration that is stored in non-volatile memory of said microprocessor comprises a set of bits equal in number to the number of said individual binary switch sections.

12. The improvement set forth in claim 8 wherein said set of individual binary switch sections comprise a side access type DIP switch to permit the individual sections to be set through an opening in a side of a housing containing the meter.

13. In an automotive, vehicle which has a meter that is operated by an operating signal from a microprocessor to indicate the value of a parameter of interest in the operation of the vehicle, and wherein the meter operating signal must be calibrated to accurately present said value, an improved, calibration means for calibrating the meter operating signal which comprises a fixed preset calibration that is stored in a non-volatile memory of the microprocessor, a first signal input for receiving from a sensor associated with said parameter of interest an uncalibrated signal, a second signal input for receiving a pre-calibrated signal for said parameter from a data link, and a combined calibration and selection means that is read by the microprocessor to calibrate the meter operating signal, said combined calibration and selection means comprising selection switch means operable to a first setting to cause the meter to be operated by the pre-calibrated signal received at said second signal input, to a second setting to cause the meter to be operated by the uncalibrated signal received at said first signal input, as calibrated by the fixed preset calibration that is stored in such non-volatile memory of the microprocessor, and to any selected setting of multiple additional settings to cause the meter to be operated by the uncalibrated signal input received at said second signal input, as calibrated by a particular calibration factor established by the particular selected setting of said multiple additional settings, and wherein said selection switch means comprises a set of individual binary switch sections, each of which is selectively operable to "1" and "0" settings.

14. The improved calibration means set forth in claim 13 wherein said set of individual binary switch sections, when said selection switch means is in said first setting, has each section at the same setting, and when said selection switch means is in said second setting, has each section in exactly the opposite setting as it had when said selection switch means was in said first setting.

15. The improved calibration means set forth in claim 14 wherein said first setting of said selection switch means corresponds to each of said individual binary switch sections being set to a "0" setting and said second setting of said selection switch means corresponds to each of said individual switch sections being set to a "1" setting.

16. The improved calibration means as set forth in claim 15 wherein the fixed preset calibration that is stored in non-volatile memory of said microprocessor comprises a set of bits equal in number to the number of said individual binary switch sections.

17. The improved calibration means set forth in claim 13 wherein said set of individual binary switch section comprise a side access type DIP switch to permit the individual sections to be set through an opening in a side of a housing containing the meter.

18. For use in an automotive, vehicle, a meter that is operated by an operating signal from a microprocessor to indicate the value of a parameter of interest associated with operation of the vehicle, and wherein the meter operating signal must be calibrated to accurately present the value of said parameter, the improvement for calibrating the meter which comprises a fixed preset calibration that is stored in a non-volatile memory of the microprocessor, a first signal input for receiving from a sensor associated with said parameter an uncalibrated signal, a second signal input for receiving a pre-calibrated signal representing said parameter from a data link, and a combined calibration and selection means that is read by the microprocessor to calibrate the meter operating signal, said combined calibration and selection means comprising selection switch means operable to a first setting to cause the meter to be operated by the pre-calibrated signal received at said second signal input, to a second setting to cause the meter to be operated by the uncalibrated signal received at said first signal input, as calibrated by the fixed preset calibration that is stored in such non-volatile memory of the microprocessor, and to any selected setting of multiple additional settings to cause the meter to be operated by the uncalibrated signal received at said second signal input, as calibrated by a particular calibration factor established by the particular selected setting of said multiple additional settings, and wherein said selection switch means comprises a set of individual binary switch sections, each of which is selectively operable to "1" and "0" settings.

19. The improvement set forth in claim 18 wherein said set of individual binary switch sections, when said selection switch means is in said first setting, has each section at the same setting, and when said selection switch means is in said second setting, has each section in exactly the opposite setting as it had when said selection switch means was in said first setting.

20. The improved calibration means as set forth in claim 19 wherein the fixed preset calibration that is stored in non-volatile memory of said microprocessor comprises a set of bits equal in number to the number of said individual binary switch sections.

* * * * *